United States Patent
Lee et al.

(10) Patent No.: US 7,862,917 B2
(45) Date of Patent: Jan. 4, 2011

(54) THERMALLY STABLE PERPENDICULAR MAGNETIC RECORDING MEDIUM

(75) Inventors: Kyung-jin Lee, Gyeonggi-do (KR); Yong-su Kim, Seoul (KR)

(73) Assignee: Samsung Electronics Co., Ltd., Suwon-Si, Gyeonggi-Do (KR)

(*) Notice: Subject to any disclaimer, the term of this patent is extended or adjusted under 35 U.S.C. 154(b) by 428 days.

(21) Appl. No.: 10/913,424

(22) Filed: Aug. 9, 2004

(65) Prior Publication Data

US 2005/0019611 A1 Jan. 27, 2005

(51) Int. Cl.
*G11B 5/66* (2006.01)
(52) U.S. Cl. ..................................... 428/836
(58) Field of Classification Search .............. 428/836, 428/836.1
See application file for complete search history.

(56) References Cited

U.S. PATENT DOCUMENTS

| | | | |
|---|---|---|---|
| 6,007,623 A * | 12/1999 | Thiele et al. ................ 117/95 |
| 6,863,998 B2 * | 3/2005 | Koda et al. ............... 428/832.2 |
| 2004/0137220 A1 * | 7/2004 | Tsuchiya et al. ............ 428/328 |
| 2004/0185307 A1 * | 9/2004 | Oikawa et al. ......... 428/694 TP |
| 2004/0191578 A1 * | 9/2004 | Chen et al. ............. 428/694 TS |
| 2004/0229006 A1 * | 11/2004 | Momose et al. ............ 428/65.3 |

OTHER PUBLICATIONS

Dieter Suess et al., "Reversal Modes, Thermal Stability and Exchange Length in Perpendicular Recording Media", IEEE Transactions on Magnetics, vol. 37, No. 4, Jul. 2001, pp. 1664-1666.

* cited by examiner

*Primary Examiner*—Holly Rickman
(74) *Attorney, Agent, or Firm*—Buchanan Ingersoll & Rooney PC

(57) ABSTRACT

Provided is a thermally stable perpendicular magnetic recording medium. The provided perpendicular magnetic recording medium includes a perpendicular magnetic recording layer between a lower layer and an upper layer, wherein a thickness of the perpendicular magnetic recording is determined by Equation 7, in the case of K>10⁵ erg/cm³ and $$D > \left(\frac{30 k_B T}{\pi \sqrt{KA}}\right)^{1/2},$$

and determined by Equation 9, in the case of K>10⁵ erg/cm³, $$n > \frac{30 k_B T}{\pi D^2 \sqrt{AK}}, \text{ and } D \leq \left(\frac{30 k_B T}{\pi \sqrt{KA}}\right)^{1/2}.$$

The provided perpendicular magnetic recording medium includes the perpendicular magnetic recording layer having a thermally stable thickness even when the value of K is large and an energy barrier does not follow KV. Thus, data recorded on the provided perpendicular magnetic recording medium is preserved for over 10 years.

5 Claims, 3 Drawing Sheets

THERMALLY STABLE PERPENDICULAR MAGNETIC RECORDING MEDIUM

BACKGROUND OF THE INVENTION

1. Field of the Invention

The present invention relates to a recording medium, and more particularly, to a thermally stable perpendicular magnetic recording medium.

2. Description of the Related Art

Generally, a parallel magnetic recording medium on which data is recorded in parallel along tracks is used in a hard disk drive (HDD).

In the case of a parallel magnetic recording medium, there is a limit due to the relation between the thickness of a parallel magnetic recording layer and the length of a parallel magnetization area, which is used to record unit bits. In other words, the length of the parallel magnetization area should be larger than the thickness of the parallel magnetic recording layer.

In order to record data on a parallel magnetic recording medium at a high density, the length of a parallel magnetization area should be reduced. However, in the case where the length of the parallel magnetization area is reduced, the thickness of the parallel magnetic recording layer should be reduced more. As a result, there is a limit in the improvement of the recording density of a parallel magnetic recording medium.

In a perpendicular magnetic recording medium, data is recorded in perpendicular magnetization area relative to tracks.

The structure of a conventional perpendicular magnetic recording medium is shown in FIG. 1.

Referring to FIG. 1, a conventional perpendicular magnetic recording medium includes a substrate 10, a perpendicular alignment underlayer 12 for perpendicularly aligning a magnetic easy axis, a perpendicular magnetic recording layer 14, a protection layer 16, and a lubricant layer 18.

In order to thermally stabilize such a perpendicular magnetic recording medium, the thermal stability of the perpendicular magnetic recording layer 14 should be secured. The thermal stability of the perpendicular magnetic recording layer 14 may be verified using a thermal magnetization reversal rate R, which is represented by Equation 1.

$$R = f_0 \exp\left(-\frac{E_B}{k_B T}\right) \quad [\text{Equation 1}]$$

In Equation 1, $f_0$ denotes an attempt frequency of generating a magnetization reversal, $E_B$ denotes an energy barrier, which is the energy for generating the magnetization reversal, $k_B$ denotes a Boltzmann constant, and T denotes a Kelvin temperature.

In general, in order to preserve the data recorded in a magnetic method for more than 10 years, $$\frac{E_B}{k_B T}$$

of Equation 1 should be larger than 60, in other words, $$\frac{E_B}{k_B T} > 60.$$

Here, $E_B$ is known as KV, in other words, $E_B$=KV, wherein K denotes a magnetic anisotropy constant of a magnetic layer on which data is recorded and V denotes a grain volume of the magnetic layer.

When the thickness of a perpendicular magnetic recording layer in a perpendicular magnetic recording medium having a large K is larger than a predetermined thickness, the energy barrier does not follow the KV anymore, but varies non-linearly. That is disclosed by Dieter Suess, Thomas Schrefl, and Josef Fidler, in "Reversal Modes, Thermal Stability and Exchange Length in Perpendicular Recording Media", IEEE Transactions on Magnetics, VOL. 37, NO. 4, pp. 1664-1666, 2001.

Accordingly, a perpendicular magnetic recording medium, which is designed based on an energy barrier of KV, may be thermally unstable because the energy barrier may be smaller than KV. As a result, the time in which data is preserved may be reduced.

SUMMARY OF THE INVENTION

The present invention provides a thermally stable perpendicular magnetic recording medium for preserving data for a long time.

According to an aspect of the present invention, there is provided a perpendicular magnetic recording medium including a perpendicular magnetic recording layer between a lower layer and an upper layer, wherein a thickness t1 of the perpendicular magnetic recording layer is determined by an expression of $$\frac{240 k_B T}{\pi K D^2} < t1 < 8\sqrt{\frac{A}{K}}.$$

Here, $K > 10^5$ erg/cm$^3$ and $$D > \left(\frac{30 k_B T}{\pi \sqrt{KA}}\right)^{1/2}.$$

In this case, D denotes an average grain diameter of the perpendicular magnetic recording layer, and A denotes an exchange constant of the material of the recording layer whose value is $10^4$ erg/cm.

The perpendicular magnetic recording layer may be formed of a single hard magnetic layer or a multi-magnetic layer including at least one hard magnetic layer.

The upper layer may include a protection layer and a lubricant layer, which are sequentially deposited, and the lower layer may include a substrate, a soft magnetic layer, and a perpendicular alignment layer.

According to another aspect of the present invention, there is provided a perpendicular magnetic recording medium including a perpendicular magnetic recording layer between a lower layer and an upper layer, wherein a thickness t2 of the perpendicular magnetic recording layer is determined by an expression of $$8n\sqrt{\frac{A}{K}} < t2 < 16n\sqrt{\frac{A}{K}}.$$

Here, $K > 10^5$ erg/cm$^3$, $$n > \frac{30 k_B T}{\pi D^2 \sqrt{AK}}, D \leq \left(\frac{30 k_B T}{\pi \sqrt{KA}}\right)^{1/2}.$$

According to the perpendicular magnetic recording medium according to the present invention, the perpendicular magnetic recording layer is thermally stable, thus data recorded on the perpendicular magnetic recording layer is preserved for a long time.

BRIEF DESCRIPTION OF THE DRAWINGS

The above and other features and advantages of the present invention will become more apparent by describing in detail an exemplary embodiment thereof with reference to the attached drawings in which:

FIGS. 2 and 3 illustrate thermal magnetization reversals for domains of perpendicular magnetic recording layers in perpendicular magnetic recording media, wherein FIG. 2 illustrates a magnetization reversal in a coherent mode and FIG. 3 illustrates a magnetization reversal in an incoherent mode;

DETAILED DESCRIPTION OF THE INVENTION

Figure 1:
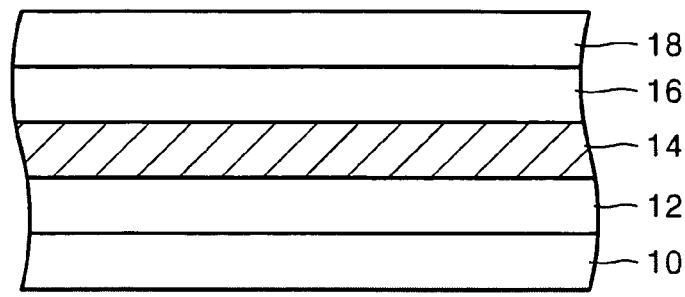
FIG. 1 is a sectional view illustrating a conventional perpendicular magnetic recording medium.

The present invention will now be described more fully with reference to the accompanying drawings, in which an exemplary embodiment of the invention is shown. In the drawings, the thicknesses of layers and regions are exaggerated for clarity.

A thermally magnetization reversal state of a perpendicular magnetic recording layer, which will be referred to as a recording layer hereafter, may vary according to the thickness of the recording layer, in the case where an anisotropy constant K of the recording layer is over a predetermined value, for example, $10^5$ erg/cm$^3$.

Figure 2:
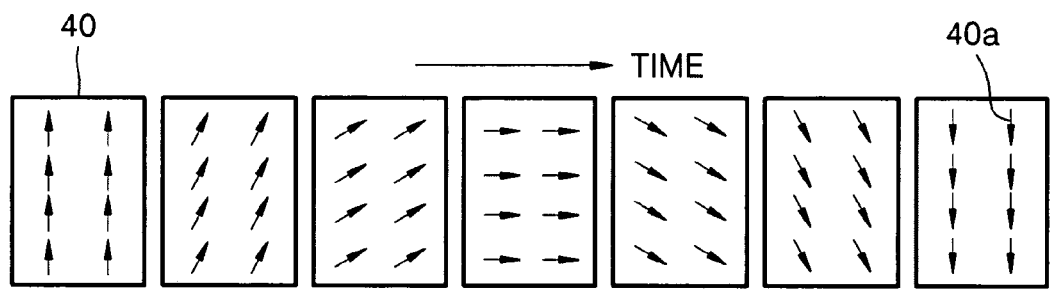

More specifically, when the thickness of the recording layer formed of a single layer or a multi-layer is smaller than a critical value, a thermally magnetization reversal of the recording layer occurs according to a coherent mode, as shown in FIG. 2. In other words, when a predetermined amount of heat is applied to the recording layer, magnetic moments 40a included in a domain 40 of the recording layer are reversed at the same time.

Figure 3:
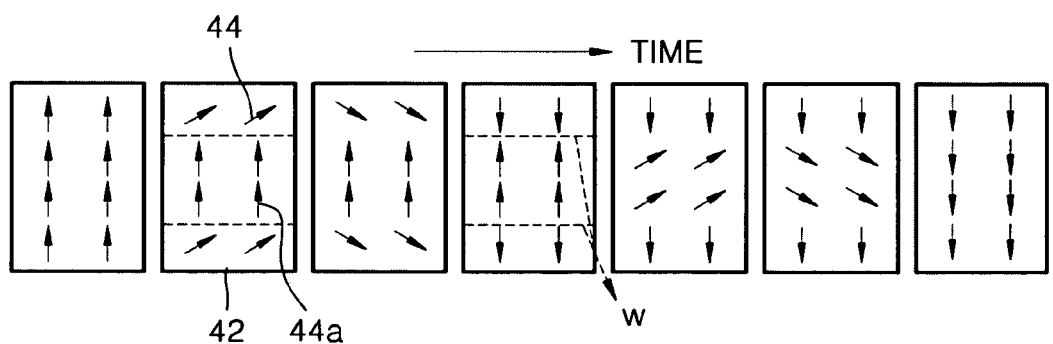

On the other hand, when the thickness of the recording layer is larger than a critical value, the magnetization reversal of the recording layer occurs according to an incoherent mode, as shown in FIG. 3. In other words, the result of the magnetization reversal is the same as that of the coherent mode shown in FIG. 2; however, the process is different from that of the coherent mode.

Referring to FIG. 3, when a predetermined amount of heat is applied to a recording layer, the magnetization states of a domain in the recording layer are different by magnetic moments. In other words, first magnetic moments 44 of the domain 42 are reversed when the heat is applied; however, second magnetic moments 44a start to be reversed after the first magnetic moments 44 are reversed.

In the incoherent mode, the first and second magnetic moments 44 and 44a in the domain 42 are reversed at different times.

During the reversal operation in the incoherent mode, the magnetization states of the first and second magnetic moments 44 and 44a are in an opposite state at a moment. Thus, an even number of domain walls W is formed on the domain 42 in a thickness direction of the recording layer. Accordingly, the number of the energy barriers of the domain 42 is N times (N=2, 4, 6 . . . ) the domain wall energy, during the reversal operation in the incoherent mode.

Figure 4:
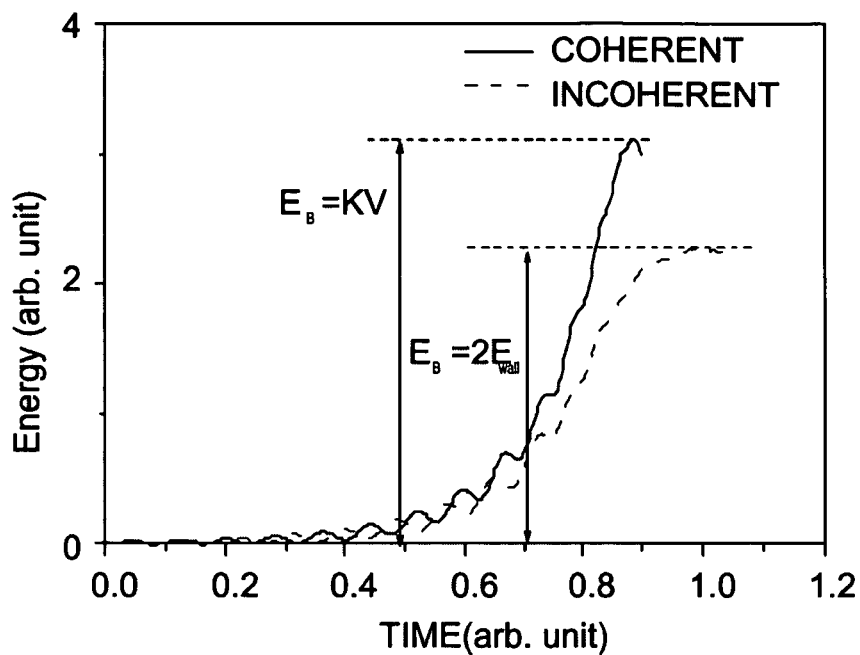
FIG. 4 is a graph illustrating changes in energy barriers of magnetization reversal modes of a perpendicular magnetic recording layer in a perpendicular magnetic recording medium.

Referring to FIG. 4, an energy barrier of the case where the thickness of a recording layer is larger than a critical value, in other words, the magnetization reversal of the recording layer occurs in an incoherent mode that will be referred to as a second energy barrier, is the same as or smaller than an energy barrier of the case where the magnetization reversal of a recording layer occurs in a coherent mode that will be referred to as a first energy barrier. Accordingly, when the thickness of the recording layer is larger than the critical thickness, a thickness range of satisfying the condition of $$\frac{E_B}{k_B T} > 60,$$

within recorded data is preserved for a long time, may be obtained.

The result of a numeral scheme for obtaining the thickness range will now be described with reference to a graph shown in FIG. 5.

Figure 5:
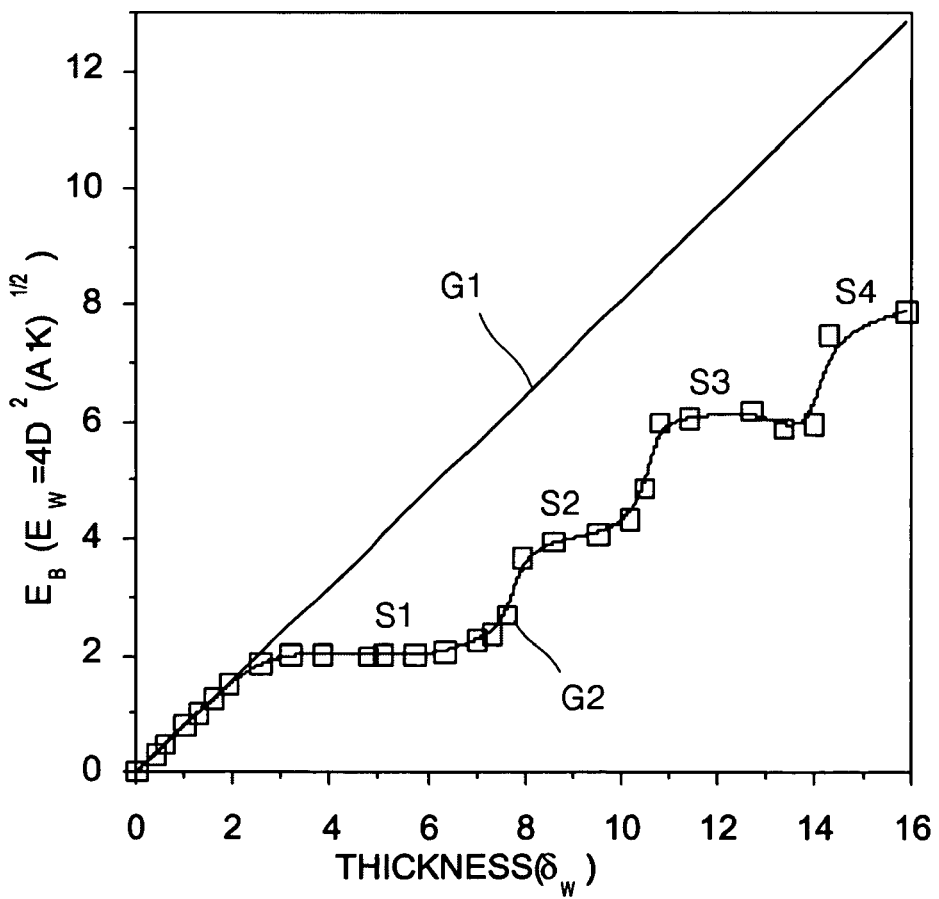
FIG. 5 is a graph illustrating changes in energy barriers of a conventional perpendicular magnetic recording medium and a perpendicular magnetic recording medium according to the present invention.

In the graph of FIG. 5, the X-axis denotes the thickness of a recording layer that is normalized to a domain wall thickness $\delta_w$, and the Y-axis denotes an energy barrier that is normalized to a domain wall energy $E_w$. The domain wall thickness $\delta_w$ and the domain wall energy $E_w$ are represented by Equations 2 and 3.

$$\delta_w = \pi \left(\frac{A}{K}\right)^{1/2} \quad \text{[Equation 2]}$$

$$E_w = 4D^2 (AK)^{1/2} \quad \text{[Equation 3]}$$

In the graph of FIG. 5, a first graph G1 denotes the energy barrier of a conventional recording layer in which $E_B$=KV, and a second graph G2 denotes the energy barrier of a recording layer according to the present invention that changes in a stair way.

When comparing the first graph G1 with the second graph G2, a first step S1 of the energy barrier of the recording layer according to the present invention starts at a thickness of $2\delta_w/\pi$. At the thickness of $2\delta_w/\pi$ that is referred to as a transition thickness $t_c$, the magnetization state of the recording layer is transited according to the coherent mode and the incoherent mode.

When the thickness of a recording layer of a perpendicular magnetic recording medium is less than a transition thickness $t_c$, the energy barriers of the first graph G1 and the second graph G2 may be represented as KV. Accordingly, in order to thermally stabilize the recording layer at the thickness of less than the transition thickness $t_c$, the thickness t of the recording layer should satisfy Equation 4.

$$\frac{240 k_B T}{K \pi D^2} < t < t_c \qquad \text{[Equation 4]}$$

Here, $k_B$ denotes a Boltzmann constant of $1.381 \times 10^{-16}$ erg/Kelvin, T denotes the absolute temperature Kelvin of the recording layer, K denotes an anisotropy constant of the recording layer, and D denotes an average grain diameter of the recording layer.

On the other hand, in order to satisfy Equation 4, Equation 5 should be satisfied.

$$\frac{240 k_B T}{K \pi D^2} < t_c \qquad \text{[Equation 5]}$$

When arranging Equation 5 by using the relation between the domain wall thickness $\delta_w$ of Equation 2 and the transition thickness $t_c$, the precondition of the grain size D can be obtained as shown in Equation 6.

$$D > \left(\frac{30 k_B T}{\pi \sqrt{KA}}\right)^{1/2} \qquad \text{[Equation 6]}$$

As a result, the range of the recording layer thickness t1 that satisfies the precondition of Equation 6 while being thermally stabilized can be calculated by using Equation 7, which is obtained by applying the relation between the domain wall thickness $\delta_w$ of Equation 2 and the transition thickness $t_c$ to Equation 4.

$$\frac{240 k_B T}{K \pi D^2} < t1 < 8\sqrt{\frac{A}{K}} \qquad \text{[Equation 7]}$$

On the other hand, when the precondition of Equation 6 is not satisfied, in other words, when the average grain diameter D of the recording layer satisfies Equation 8, the energy barrier of the recording layer is 2n times of the domain wall energy, wherein n is a natural number. Thus, even when the thickness of the recording layer is provided according to Equation 7, the perpendicular magnetic recording medium is thermally unstable.

$$D \leq \left(\frac{30 k_B T}{\pi \sqrt{KA}}\right)^{1/2} \qquad \text{[Equation 8]}$$

In this case, it is determined whether the energy barrier of the first step S1 of the second graph G2 satisfies the thermally stabilization condition, in other words, $$\frac{E_B}{k_B T} > 60.$$

When the energy barrier of the first step S1 does not satisfy the thermally stabilization condition, it is determined whether the energy barriers of second, third, and fourth steps S2, S3, and S4 satisfy the thermally stabilization condition. In other words, it is determined whether the energy barrier $E_B$ of any one of the first through the fourth steps S1 through S4 is larger than 60 $k_B$T.

According to the above process, a region of satisfying the thermally stabilization condition and Equation 8, in other words, the thickness range of the recording layer may be determined among the first through fourth steps S1 through S4. When considering the trend of reducing the size of a recording medium, the thickness of the recording layer is formed to as thin as possible. Thus, the thickness range of satisfying the thermal stabilization condition and Equation 8 that is located in the first step S1 may be used other than in the second through fourth steps S2 through S4. Moreover, the thickness range of the recording layer at the front portion of the first step S1 whose thickness is small may be used. In the case of using the thickness ranges of the recording layer of the second through fourth steps S2 through S4, the thickness ranges at the front portions of the second through fourth steps S2 through S4 may be used.

The range of the thickness t2 detected at the front portion of the first step S1, in other words, a portion adjacent to the transition thickness $t_c$ is represented by Equation 9.

$$8n\sqrt{\frac{A}{K}} < t2 < 16n\sqrt{\frac{A}{K}} \qquad \text{[Equation 9]}$$

Here, n of Equation 9 is a minimum integral number of satisfying Equation 10.

$$\frac{30 k_B T}{\pi D^2 \sqrt{AK}} < n \qquad \text{[Equation 10]}$$

Figure 6:
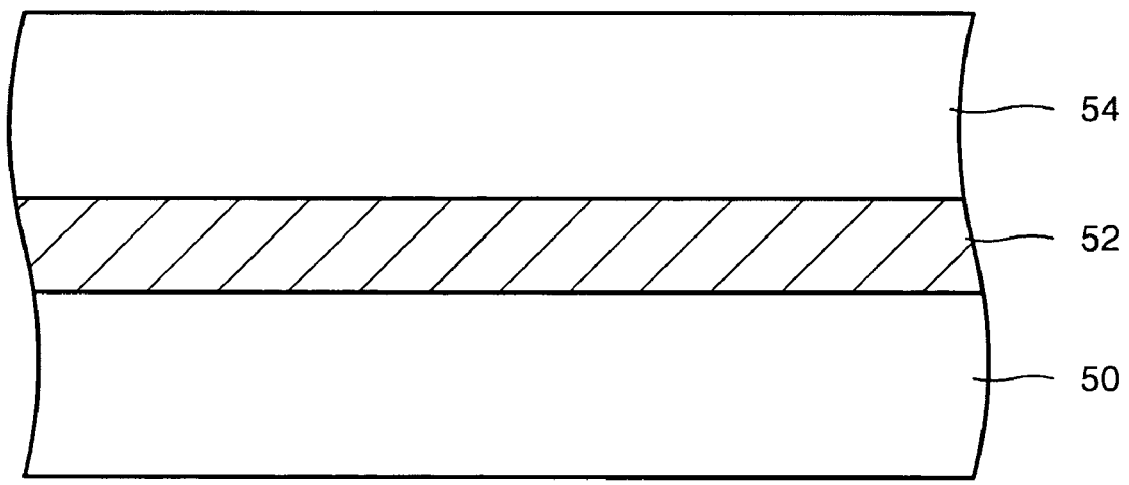
FIG. 6 is a sectional view illustrating a thermally stable perpendicular magnetic recording medium according to the present invention.

FIG. 6 is a sectional view illustrating a perpendicular magnetic recording medium according to an embodiment of the present invention. Here, reference numerals 50, 52, and 54 denote a lower layer, a recording layer, and an upper layer, respectively.

The lower layer 50 includes a substrate and various material layers formed thereon. For example, the lower layer 50 includes a substrate and a perpendicular alignment layer, which is formed on the substrate and aligns the magnetization easy axis of the recording layer 52 to be perpendicular to the surface of the recording layer 52. Here, a soft magnetic layer may be included between the substrate and the perpendicular alignment layer. The upper layer 54 may be formed of various material layers, for example, a protection layer and a lubricant layer.

On the other hand, the recording layer 52 may be formed of various magnetic layers; however the recording layer 52 is formed of a single hard magnetic layer or a multi-magnetic layer including at least one hard magnetic layer whose anisotropy constant K is larger than $10^5$ erg/cm$^3$. The thickness of the recording layer 52 may be any one of the thickness t1 satisfying Equations 6 and 7 and the thickness t2 satisfying Equations 8 and 9.

The character A in Equations 2 through 9 denotes an exchange constant of the material of the recording layer whose value is $10^4$ erg/cm.

Hereafter, a numeral scheme performed to determine the thermally stable thickness range of a recording layer by applying Equations 6 through 9 to the recording layer will be described.

In the numeral scheme, an FePt layer having an anisotropy constant K of $66 \times 10^6$ erg/cm³ was used as a recording layer of a perpendicular magnetic recording medium. Here, a temperature T was set to 300 K. In addition, the numeral scheme was performed to each grain diameter whose range was varied from 1 nm to 10 nm.

The result of the numeral scheme is shown in Table 1.

TABLE 1

| grain diameter (nm) | n | case | thickness range (nm) | minimum energy barrier/$k_B T$ |
|---|---|---|---|---|
| 1 | 5 | II | 49.3 < t < 98.6 | 61.6 |
| 2 | 2 | II | 19.7 < t < 39.4 | 98.6 |
| 3 | — | I | 5.3 < t < 9.8 | 60 |
| 4 | — | I | 3 < t < 9.8 | 60 |
| 5 | — | I | 2 < t < 9.8 | 60 |
| 6 | — | I | 1.4 < t < 9.8 | 60 |
| 7 | — | I | 1 < t < 9.8 | 60 |
| 8 | — | I | 0.75 < t < 9.8 | 60 |
| 9 | — | I | 0.6 < t < 9.8 | 60 |
| 10 | — | I | 0.5 < t < 9.8 | 60 |

In Table 1, n, which denotes the minimum integral number of each grain size, is obtained from Equation 10. The case I denotes the magnetization reversal in the coherent mode, and the case II denotes the magnetization reversal in the incoherent mode.

Referring to Table 1, the case II is generated when the grain diameter is 1 nm of 2 nm and n is 5 or 2; however, the minimum energy barrier/$k_B T$ is larger than 60 in the thickness range of Table 1. That means, when the grain diameter is 1 nm or 2 nm, the case II is generated, however, in the case where the minimum integral n is 5 or 2 and the thickness of the FePt layer is included in the thickness range of Table 1, the FePt layer may be thermally stable for over 10 years.

On the other hand, when the grain diameter is any one of 3 through 10 nm and the thickness of the FePt layer is included in the thickness range of Table 1, the minimum energy barrier/$k_B T$ of the FePt layer is larger than 60, thus the FePt layer may be thermally stable for over 10 years.

As a result, when the thickness of the FePt layer is included in the thickness ranges of Table 1, the FePt layer is thermally stable regardless of the case of the FePt layer.

Thus, the data recorded on the FePt layer having the thickness included in the thickness ranges of Table 1 may be reserved for a long time.

While the present invention has been particularly shown and described with reference to an exemplary embodiment thereof, it will be understood by those of ordinary skill in the art that various changes in form and details may be made therein without departing from the spirit and scope of the present invention as defined by the following claims. For example, a perpendicular magnetic recording medium including a recording layer having a thickness slightly deviated from the thickness range of Equation 7 or Equation 9 may be formed. In addition, since the difference of thicknesses among the first through fourth steps S1 through S4 is very small, a recording layer having a thickness range at the rear portion of the first step S1 or the thickness ranges of the second through fourth steps S2 through S4 may be formed.

As described above, a recording layer of a perpendicular magnetic recording medium according to the present invention has a thermally stable thickness, which is obtained from Equation 7 in the case where the average grain diameter D of the recording layer satisfies Equation 6 and is obtained from Equation 9 in the case where the average grain diameter D satisfies Equation 8. Thus, a perpendicular magnetic recording medium of preserving data for a longer time compared to a conventional perpendicular magnetic recording medium may be formed. In other words, the data recorded on the recording layer can be thermally stable for over 10 years. In addition, the thickness of the thermally stable recording layer according to the grain diameter can be determined by using Equations 6 through 9.

What is claimed is:

1. A perpendicular magnetic recording medium including a perpendicular magnetic recording layer between a lower layer and an upper layer, wherein a thickness t2 of the perpendicular magnetic recording layer is determined by an expression of $$8n\sqrt{\frac{A}{K}} < t2 < 16n\sqrt{\frac{A}{K}},$$

here, $$K > 10^5 \text{ erg/cm}^3, n > \frac{30 k_B T}{\pi D^2 \sqrt{AK}}, D \leq \left(\frac{30 k_B T}{\pi \sqrt{KA}}\right)^{1/2},$$

D denotes an average grain diameter of the recording layer, and A denotes an exchange constant of the material of the recording layer, wherein D=2 nm and 19.7 nm≦t2<39.4 nm or D=1 nm and 49.3 nm<t2<98.6 nm.

2. The perpendicular magnetic recording medium of claim 1, wherein the perpendicular magnetic recording layer is a single hard magnetic layer or a multi-magnetic layer including at least one hard magnetic layer.

3. The perpendicular magnetic recording medium of claim 1, wherein the upper layer includes a protection layer and a lubricant layer.

4. The perpendicular magnetic recording medium of claim 2, wherein the upper layer includes a protection layer and a lubricant layer.

5. The perpendicular magnetic recording medium of claim 1, wherein the lower layer includes a substrate and a perpendicular alignment underlayer formed on the substrate and a soft magnetic layer between the perpendicular alignment layer and the substrate.

* * * * *